(12) United States Patent
Han (10) Patent No.: US 9,632,364 B2
(45) Date of Patent: Apr. 25, 2017

(54) DISPLAY APPARATUS (71) Applicant: Samsung Display Co., Ltd., Yongin, Gyeonggi-Do (KR)

(72) Inventor: Byung-Uk Han, Cheonan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 323 days.

(21) Appl. No.: 14/252,466

(22) Filed: Apr. 14, 2014

(65) Prior Publication Data
US 2014/0307407 A1    Oct. 16, 2014

(30) Foreign Application Priority Data

Apr. 15, 2013   (KR) .................. 10-2013-0041045

(51) Int. Cl.
H05K 9/00         (2006.01)
G02F 1/1339       (2006.01)

(52) U.S. Cl.
CPC ........ G02F 1/1339 (2013.01); G02F 2201/50 (2013.01)

(58) Field of Classification Search
CPC ......... H05B 33/04; H05B 33/10; H01L 51/24; H01L 51/5237; H01L 51/5246

USPC .......... 174/350–358, 254–258; 313/498–512
See application file for complete search history.

(56) References Cited

U.S. PATENT DOCUMENTS

| 8,860,919 | B2 * | 10/2014 | Chung | H01L 51/5246 313/512 |
| 2005/0174048 | A1 * | 8/2005 | Matsukaze | H01L 27/322 313/506 |
| 2006/0049396 | A1 * | 3/2006 | Pichler | H01L 21/50 257/40 |
| 2006/0055317 | A1 | 3/2006 | Lee et al. | |
| 2007/0170861 | A1 | 7/2007 | Lee et al. | |

FOREIGN PATENT DOCUMENTS

| KR | 10-2006-0023325 A | 3/2006 |
| KR | 10-2006-0025242 A | 3/2006 |
| KR | 10-2006-0025243 A | 3/2006 |
| KR | 10-2007-0077010 A | 7/2007 |
| KR | 10-2011-0020613 A | 3/2011 |

* cited by examiner

Primary Examiner — Tuan T Dinh
(74) Attorney, Agent, or Firm — Lee & Morse, P.C.

(57) ABSTRACT

A display apparatus includes a first substrate having a pixel region and a peripheral region surrounding the pixel region, the first substrate including a pixel disposed in the pixel region, a second substrate opposite to the first substrate, and a sealing member including a plurality of seals disposed on the peripheral region, the sealing member encapsulating the pixel region between first substrate and the second substrate.

17 Claims, 4 Drawing Sheets

DISPLAY APPARATUS

CROSS-REFERENCE TO RELATED APPLICATION

Korean Patent Application No. 10-2013-0041045, filed on Apr. 15, 2013, in the Korean Intellectual Property Office, and entitled: "DISPLAY APPARATUS," is incorporated by reference herein in its entirety.

BACKGROUND

1. Field

Embodiments relate to a display apparatus.

2. Description of the Related Art

Flat display devices have been widely used because of their various features such as slim thickness, low power consumption and less weight, etc. Flat display devices include liquid crystal display (LCD), plasma display panel (PDP) and field emission display (FED), organic light emitting device (OLED) and so on.

SUMMARY

Embodiments are directed to a display apparatus, including a first substrate having a pixel region and a peripheral region surrounding the pixel region, the first substrate including a pixel disposed in the pixel region, a second substrate opposite to the first substrate, and a sealing member including a plurality of seals disposed on the peripheral region, the sealing member encapsulating the pixel region between first substrate and the second substrate.

The sealing member may include a first seal surrounding the pixel region, and a second seal surrounding the first seal.

The first seal may include an organic material and the second seal may include an inorganic material.

The second seal may further include a polymeric compound for absorbing light.

The sealing member may further include a first reinforcement disposed between the second seal and the second substrate.

The first reinforcement may include a carbon black.

The first reinforcement may include a metal pattern.

The sealing member may further include a second reinforcement disposed between the second seal and the first substrate.

The second reinforcement may include a carbon black.

The second reinforcement may include a metal pattern.

The sealing member may further include an outside seal contacting an outer surface of the second substrate, an outer surface of the second seal, and an outer surface of the first substrate.

The first seal may include an organic material, the second seal may include an inorganic material, and the outside seal may include an inorganic material.

The outside seal may further include a polymeric compound for absorbing light.

The sealing member may further include a first reinforcement disposed between the second seal and the second substrate.

The first reinforcement may include a carbon black.

The first reinforcement may include a metal pattern.

The sealing member may further include a second reinforcement disposed between the second seal and the first substrate.

The second reinforcement may include a carbon black.

The second reinforcement may include a metal pattern.

Embodiments are also directed to a display apparatus, including a first substrate having a pixel region and a peripheral region surrounding the pixel region, the first substrate including a pixel disposed in the pixel region, a second substrate opposite to the first substrate, a first seal disposed in the peripheral region, the first seal encapsulating a gap between the first substrate and the second substrate, and a second seal contacting an outer surface of the first substrate, an outer surface of the second substrate, and an outer surface of the first seal.

The first seal may include an organic material and the second seal may include an inorganic material.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the present example embodiment to those skilled in the art. In the drawing figures, dimensions may be exaggerated for clarity of illustration. Like reference numerals refer to like elements throughout.

It will be understood that, although the terms first, second, third, etc., may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In understanding reference marks added to each elements in each drawing, it is carefully understood that same elements have the same reference marks herein, although it is marked in other drawings. Additionally, the description of well known elements or functions may be omitted to avoid obscuring the description of other details.

Figure 1:
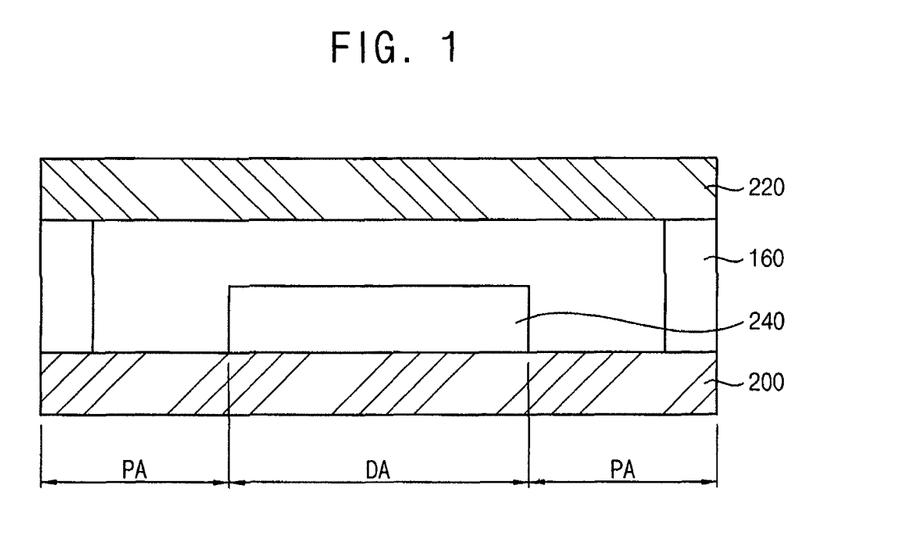
FIG. 1 is a cross sectional view illustrating a display apparatus in accordance with an example embodiment.

FIG. 1 is a cross sectional view illustrating a display apparatus in accordance with an example embodiment.

In the present example embodiment shown in FIG. 1, a display apparatus includes a first substrate 200 having a pixel region DA and a peripheral region PA surrounding the pixel region DA, a pixel 240 disposed on the first substrate 200 in the pixel region DA, a second substrate 220 opposite to the first substrate 200, and a sealing member 160 encapsulating the pixel 240. The peripheral region PA may not include a pixel. The sealing member 160 may be formed using an epoxy resin as an organic seal to be formed from seal hardening by ultraviolet in high temperature. Also, the sealing member 160 may include a frit as an inorganic seal to be formed from seal hardened by laser or infrared. The frit may provide benefits such as low processing temperature, good adhesion, and close encapsulation with slim thickness. However, the frit may be a brittle material vulnerable to an external impact, i.e., may be fragile.

Figure 2:
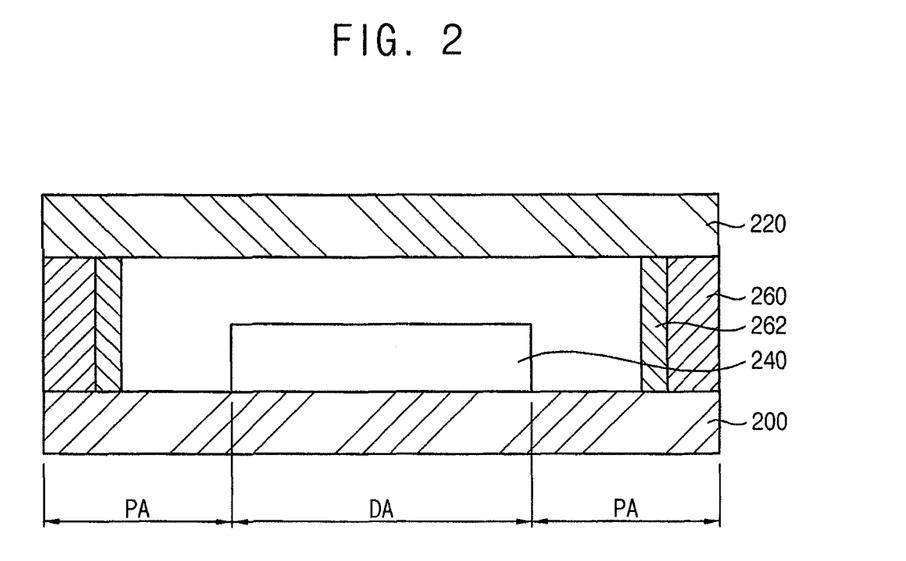
FIG. 2 is a cross sectional view illustrating a display apparatus in accordance with another example embodiment.

FIG. 2 is a cross sectional view illustrating a display apparatus in accordance with another example embodiment.

In the present example embodiment shown in FIG. 2, a display apparatus includes the pixel 240, the first substrate 200, the second substrate 220, and a sealing member 260/262. The display apparatus may be a flat display apparatus, for example.

The pixel 240 disposed on the first substrate 200 in the pixel region DA may include a display device, a thin film transistor, and one or more electrodes. For example, the pixel 240 may include a liquid crystal device of an LCD, an organic light emitting diode of an OLED, an electrophoretic device of an electrophoretic display, etc.

In the present example embodiment, the first substrate 200 has a pixel region DA in which pixel is disposed and a peripheral region PA surrounding the pixel region DA. For example, the first substrate 200 may be an inorganic substrate including glass or polysilicon, the first substrate 200 may be a plastic substrate including polyethylene terephthalate (PET), polyethylene naphthalate (PEN), polyimide, etc., the first substrate 200 may be a flexible substrate including metal or a polymer having flexibility, etc.

A second substrate 220 opposes the first substrate 200. For example, the second substrate 220 covering the pixel 240 may be disposed in parallel to the first substrate 200. In the present example embodiment, there is a space between the second substrate 220 and the first substrate 200, and the pixel 240 is disposed in the space. In another example embodiment, the second substrate 220 may contact the first substrate 200.

The second substrate 220 may provide chemical reliability and advanced encapsulation to protect devices of the pixel 240 on the first substrate 200, and the second substrate 220 may provide sufficient transparency of visible light to implement a high-definition image. The second substrate 220 may include a glass, a transparent metal film, an organic layer or an inorganic layer, etc.

In the present example embodiment, the sealing member 260/262 includes a first seal 262 and a second seal 260 to isolate the pixel 240 from external environment by encapsulating a gap between the first substrate 200 and the second substrate 220 in the peripheral region PA. In another example embodiment, the sealing member 260/262 may further include plural seals (not illustrated in FIG. 2).

In the present example embodiment, the first seal 262 and the second seal 260 are a different material from each other. In another example embodiment, the first seal 262 and the second seal 260 may each be a same material.

In the present example embodiment, as illustrated in FIG. 2, the first seal 262 directly contacts the second seal 260. In another example embodiment (not illustrated in FIG. 2), the first seal 262 and the second seal 260 may be disposed separately, i.e., having some space therebetween. In another example embodiment, another seal may be disposed between the first seal 262 and the second seal 260.

In an example embodiment, one of the seals 260 and 262 includes an organic material, and the other includes an inorganic material. The inorganic seal may be more moisture-proof than the organic seal because of its small pore size. For example, the organic seal 262 may be disposed to the inside, and the inorganic seal 260 may be disposed to the outside to isolate the organic seal 262 from external moisture. In another example embodiment, the organic seal and the inorganic seal may swap those positions to each other.

As an organic seal, the first seal 262 may include a compound resin such as epoxy resin. For example, the first seal 262 may include Bisphenol-F, as ultraviolet hardening material, and may include Bisphenol-A, acryl, phenyl silicone, and other organic materials. The organic seal having elastic properties may prevent the inorganic seal from detaching from the first substrate 200 or second substrate 220 as a result of external impact.

As an inorganic seal, the second seal 260 may include a glass material and other inorganic materials. For example, the glass material may be an appropriate mixture of inorganic materials such as barium oxide (BaO), lanthanum oxide ($La_2O_3$), alumina ($Al_2O_3$), boron trioxide ($B_2O_3$), silicon oxide ($SiO_2$), etc., and may provide the display apparatus with chemical reliability and tightness relative to moisture and gas, and the glass material may have good adhesion to directly bond to the first substrate 200 and the second substrate 220. The inorganic seal 260 of glass may be suitable for advanced encapsulation.

According to the present example embodiment, by sealing the display devices using two different seals 260 and 262, the weakness of each seal may be mutually reinforced, and durability of the display apparatus may be improved. By preventing the display apparatus from fracturing during a process such as cutting process in which an external impact may occur, yield of the display apparatus may be improved too. Additionally, the dead space may be decreased, e.g., by allowing the cutting process of to be conducted without being apart from the sealing member, in comparison with another cutting process of display apparatus having only a single seal.

Figure 3:
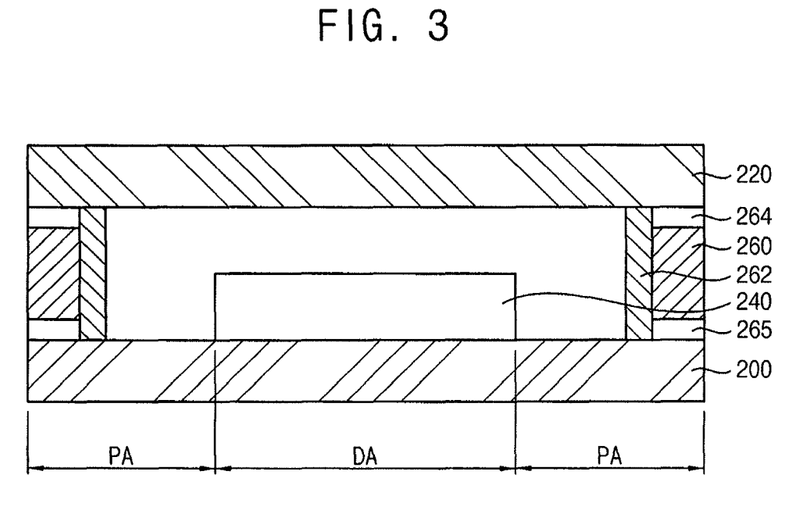
FIG. 3 is a cross sectional view illustrating a display apparatus in accordance with another example embodiment.

FIG. 3 is a cross sectional view illustrating a display apparatus in accordance with another example embodiment.

In the present example embodiment, elements of the display apparatus except sealing member 260/262/264/265 are substantially same as corresponding elements of the display apparatus described with reference to FIG. 2. Therefore, a detailed description of same elements may be omitted herein to avoid repetition.

Referring to FIG. 3, a display apparatus includes the pixel 240, the first substrate 200, the second substrate 220, and sealing member 260/262/264/265.

The sealing member 260/262/264/265 includes the first seal 262, the second seal 260, a first reinforcement 264 disposed between the second seal 260 and the second substrate 220, and a second reinforcement 265 disposed between the second seal 260 and the first substrate 200.

In the present example embodiment, as illustrated in FIG. 3, the first seal 262 directly contacts the second seal 260. In another example embodiment (not illustrated in FIG. 3), the first seal 262 and the second seal 260 may be disposed separately, i.e., having some space therebetween. In another example embodiment, another seal may be disposed between the first seal 262 and the second seal 260.

In the present example embodiment, the one of the seals 260 and 262 includes an organic material, and the other seal includes an inorganic material. For example, as an organic seal, the first seal (262) may include a compound resin like an epoxy resin; a detailed description of the organic seal is already discussed above with reference to FIG. 2. As an inorganic seal, the second seal 260 may include a glass material, etc.; a detailed description of the inorganic seal is already discussed above with reference FIG. 2.

In the present example embodiment, as illustrated in FIG. 3, the first seal 262 is disposed to the inside, and the second seal 260 is disposed to the outside. In another example embodiment, the first seal 262 and the second seal 260 may swap those positions each other.

In the present example embodiment, the first reinforcement 264 and the second reinforcement 265 are a same material. To protect devices disposed in the sealing region from damage caused by moisture and to prevent the devices disposed in the sealing region from oxidizing occurred by external environment, the first reinforcement 264 and the second reinforcement 265 may have properties as follows.

First, the reinforcements may provide tight adhesion between substrate and sealing member. Second, the reinforcements may have advanced heat stability because the hardening process of sealing member may be conducted at high temperature. For example, as a laser may penetrate into sealing region and may damage the display devices disposed in the sealing region, the reinforcements may serve to protect the display devices disposed in sealing region from the potential damage caused during laser hardening process. Third, the reinforcements may prevent the penetration of moisture effectively. For example, the reinforcements 264 and 265 may include a carbon black, and may further include other materials, and may have the layered structure including a carbon black layer and other layers to improve their properties. As another example, the reinforcements 264 and 265 may include a metal pattern. The metal pattern may include one or more metals having high laser blocking property such as silver (Ag), gold (Au), platinum (Pt), aluminum (Al), etc. In an example embodiment, the metal pattern may include a same metal included in the some devices constituting the pixel 240. In this case, as additional process to form the metal pattern may not be needed, the patterning process may be simple.

According to the present example embodiment, the sealing member 260/262/264/265 includes the reinforcements 264 and 265. Thus, the sealing member 260/262/264/265 may closely encapsulate the display apparatus and help reduce damage of the pixel 240 occurred during a hardening process.

Figure 4:
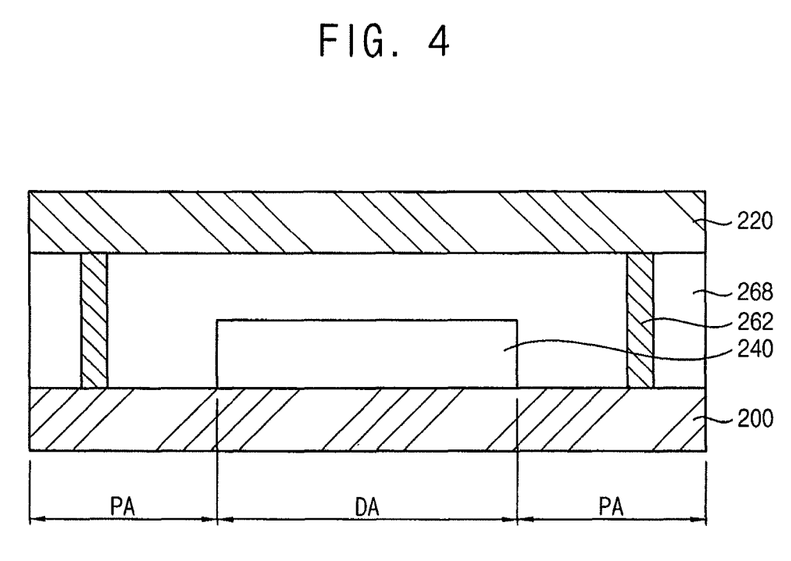
FIG. 4 is a cross sectional view illustrating a display apparatus in accordance with another example embodiment.

FIG. 4 is a cross sectional view illustrating a display apparatus in accordance with another example embodiment.

In the present example embodiment, all elements except a second seal 268 are substantially same as corresponding elements of the display apparatus described with reference to FIG. 2. Therefore, a detailed description of same elements may be omitted herein to avoid repetition.

Referring to FIG. 4, a display apparatus includes a pixel 240, a first substrate 200, a second substrate 220, and a sealing member 262/268.

In the present example embodiment, the sealing member 262/268 includes a first seal 262 and a second seal 268. The first seal 262 directly contacts the second seal 268. In another example embodiment (not illustrated in FIG. 4), the first seal 262 and the second seal 268 may be disposed separately having some space therebetween. In another example embodiment, another seal may be disposed between the first seal 262 and the second seal 268.

In the present example embodiment, the one of the seals in the sealing member 262/268 includes an organic material, and the other seal in the sealing member 262/268 includes an inorganic material. For example, as an organic seal, the first seal 262 may include a compound resin like an epoxy resin; a detailed description of the first seal 262 is already discussed above with reference to FIG. 2. As an inorganic seal, the second seal 268 may include a glass material, etc.; a detailed description of the second seal 268 is already discussed above with reference FIG. 2.

In the present example embodiment, as illustrated in FIG. 4, the first seal 262 is disposed to the inside, and the second seal 268 is disposed to the outside. In another example embodiment, the first seal 262 and the second seal 268 may swap those positions each other.

In the present example embodiment, the second seal 268 includes a polymeric compound. The polymeric compound may be an organic compound such as a phthalocyanine type compound, a cyanine type compound, an aminium type compound, an immonium type compound, a squalium type compound, a polymethine type compound, an anthraquinone type compound, an azo type compound, and the polymeric compound may also be an inorganic-containing compound such as a resin compound including carbon black, etc. The polymeric compound may have a high absorption rate of laser light, the polymeric compound may help minimize adverse effects of a laser on display devices during the second seal hardening process. In this case, the absorbed energy from the laser may be converted to thermal energy to help hardening of the second seal 268.

According to the present example embodiment, the second seal 268 further includes the polymeric compound. Thus, the sealing member 262/268 may encapsulate display apparatus more tightly and more closely, and the polymeric compound may help prevent damage to devices from occurring during the hardening process.

Figure 5:
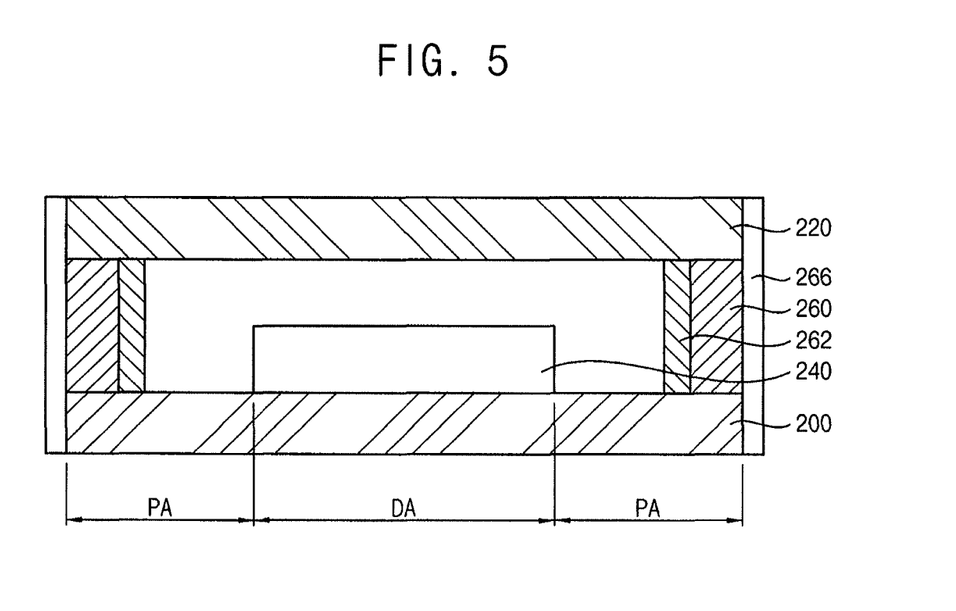
FIG. 5 is a cross sectional view illustrating a display apparatus in accordance with another example embodiment.

FIG. 5 is a cross sectional view illustrating a display apparatus in accordance with another example embodiment.

In the present example embodiment, all elements except sealing member 262/260/266 are substantially same as corresponding elements of the display apparatus described with reference in FIG. 2. Therefore, a detailed description of same elements may be omitted herein to avoid repetition.

Referring to FIG. 5, a display apparatus includes a pixel 240, a first substrate 200, a second substrate 220, and a sealing member 262/260/266.

In the present example embodiment, the sealing member 262/260/266 includes a first seal 262, a second seal 260, and an outside seal 266. The first seal 262 and the second seal 260 encapsulate a gap between the first substrate 200 and the second substrate 220. The outside seal 266 directly contacts an outer surface of the first substrate 200 and an outer surface of the second substrate 220 to isolate the pixel 240 from the external environment; the outside seal 266 completely encapsulates the pixel 240. The outer seal 266 may contact a lateral side of the first substrate 200 at an edge of the peripheral region PA and a lateral side of the second substrate 220 at an edge corresponding to the edge of the peripheral region PA. In an example embodiment, the outside seal 266 is formed by a hardening process after cutting of the display apparatus in a cell unit.

In the present example embodiment, the first seal 262, the second seal 260, and the outside seal 262 are each a different material from each other. In another example embodiment (not illustrated in FIG. 5), the first seal 262, the second seal 260, and the outside seal 266 are a same material.

In the present example embodiment, as illustrated in FIG. 5, the first seal 262, the second seal 260, and the outside seal 266 directly contact each other. In another example embodiment (not illustrated in FIG. 5), the first seal 262, the second seal 260, and the outside seal 266 may be disposed separately having some space between the first seal 262, the second seal 260, and the outside seal 266. In another example embodiment, another seal may be disposed between the first seal 262, the second seal 260, and the outside seal 266.

In the present example embodiment, the one of the seals 262, 260, 266 is an organic seal and the other seals are inorganic seals. For example, as an organic seal, the first seal (262) may include compound resin like an epoxy resin; a detailed description of the organic seal is already discussed above with reference to FIG. 2. As an inorganic seal, the second seal 260 may include a glass material etc.; a detailed description of the inorganic seal is already discussed above with reference FIG. 2. The outside seal 266, as an inorganic seal, may include frit. The frit may provide advantages of high durability and effective waterproof properties with slim thickness, and the frit may be hardened at low temperature by using laser or infrared. The frit may include a base element like silicon dioxide ($SiO_2$), boron trioxide ($B_2O_3$), alumina ($Al_2O_3$), etc., and an additional element such as copper oxide ($CuO$), iron(III) oxide ($Fe_2O_3$), titanium dioxide ($TiO_2$), etc.

In the present example embodiment, as illustrated in FIG. 5, the first seal 262 is disposed to the inside and the second seal 260 is disposed to the outside. In another example embodiment, the first seal 262 and the second seal 260 may swap those positions each other.

According to the present example embodiment, in comparison with a general cutting process using extra space and a cutting process conducted after encapsulating process, a cutting process may be conducted without using extra space and before the encapsulating process. Therefore, the dead space of a display apparatus may be shrunk.

Figure 6:
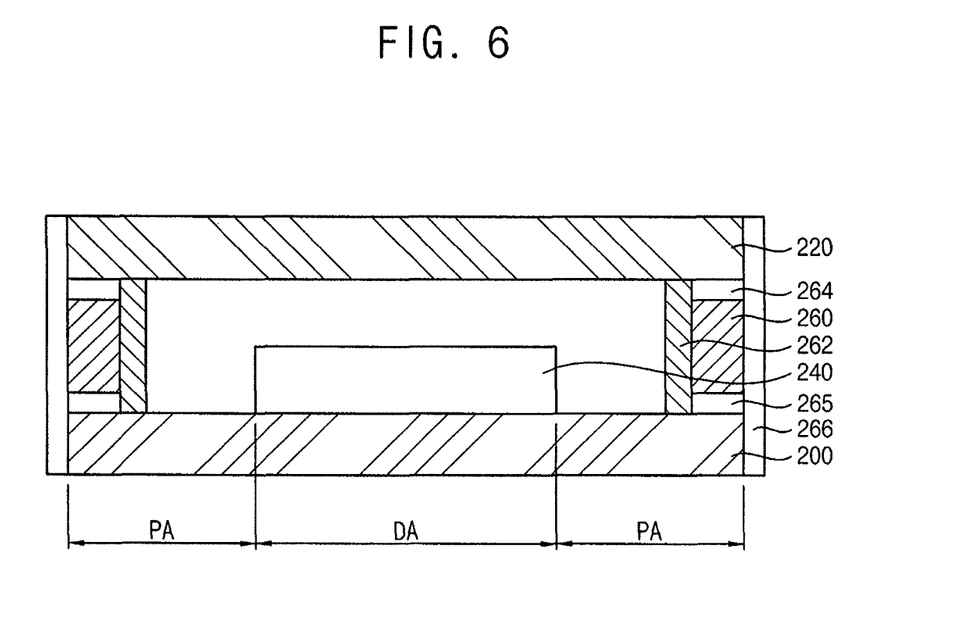
FIG. 6 is a cross sectional view illustrating a display apparatus in accordance with another example embodiment.

FIG. 6 is a cross sectional view illustrating a display apparatus in accordance with another example embodiment.

In the present example embodiment, all elements except a sealing member 260/262/264/265/266 are substantially same as corresponding elements of the display apparatus described with reference in FIG. 5. Therefore, a detailed description of same elements may be omitted herein to avoid repetition.

Referring to FIG. 6, a display apparatus includes the pixel 240, the first substrate 200, the second substrate 220, and a sealing member 260/262/264/265/266.

The sealing member 260/262/264/265/266 includes the first seal 262, the second seal 260, the first reinforcement 264 disposed between the second seal 260 and the second substrate 220, the second reinforcement 265 disposed between the second seal 260 and the first substrate 200, and the outside seal 266.

In the present example embodiment, the elements of the first seal 262, the second seal 260, and the outside seal 266 are substantially same as corresponding elements of the display apparatus described with reference in FIG. 5, and detailed descriptions of the first seal 262, the second seal 260, and the outside seal 266 are described above with reference in FIG. 5.

In the present example embodiment, the first reinforcement 264 and the second reinforcement 265 include a same material, and the reinforcements may provide tight adhesion between the seals 262 and 260 and the substrates 200 and 220 to prevent display devices in sealing region from be exposed to moisture and gas, and the reinforcements may prevent devices from being damaged during a hardening process. In the present example embodiment, the reinforcements 264 and 265 may include carbon black or a metal pattern; detailed descriptions of the reinforcements 264 and 265 are described above with reference in FIG. 3.

According to the present example embodiment, the sealing member 260/262/264/265/266 includes the organic seal and inorganic seal. Thus, the durability of the encapsulation may be improved. The outside seal 266 encapsulates an outer surface of the second seal 260 after cutting process. Thus, dead space during cutting process may be shrunk.

Figure 7:
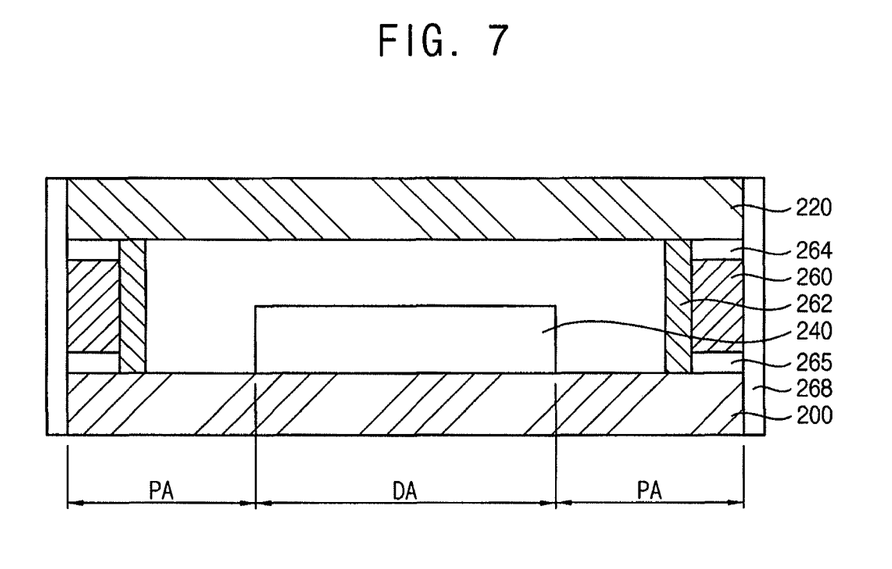
FIG. 7 is a cross sectional view illustrating a display apparatus in accordance with another example embodiment.

FIG. 7 is a cross sectional view illustrating a display apparatus in accordance with another example embodiment.

In the present example embodiment, all elements except a sealing member 260/262/264/265/268 are substantially same as corresponding elements of the display apparatus described with reference in FIG. 6. Therefore, a detailed description of same elements may be omitted herein to avoid repetition.

Referring to FIG. 7, a display apparatus includes the pixel 240, the first substrate 200, the second substrate 220, and a sealing member 260/262/264/265/268.

The sealing member 260/262/264/265/268 includes the first seal 262, the second seal 260, the first reinforcement 264 disposed between the second seal 260 and the second substrate 220, the second reinforcement 265 disposed between the second seal 260 and the first substrate 200, and an outside seal 268.

In the present example embodiment, elements of the first seal 262, the second seal 260, the first reinforcement 264, and the second reinforcement 265 are substantially same as corresponding seals and reinforcements described with reference in FIG. 6, and duplicated detailed descriptions of the seals 262 and 260, and the reinforcements 264 and 265 are described above with reference in FIG. 6.

In the present example embodiment, the outside seal 268 includes an inorganic material and a polymeric compound.

For example, the polymeric compound may be an organic compound such as a phthalocyanine type compound, a cyanine type compound, an aminium type compound, an immonium type compound, a squalium type compound, a polymethine type compound, an anthraquinone type compound, an azo type compound, and the polymeric compound may also be an inorganic-containing compound such as a resin compound including carbon black, etc. The polymeric compound may have a high absorption rate of laser light, the polymeric compound may be able to absorb laser light easily in the outside seal 268. Thus, the polymeric compound may help minimize adverse effect of a laser on display devices. In this case, the energy generated from absorbing laser light may be converted to thermal energy to help hardening of the outside seal 268.

The inorganic material included in the outside seal 268 may be a glass material or frit. Detailed descriptions of the glass and the frit are described above with reference in FIG. 2 and FIG. 4 each.

According to the present example embodiment, the outside seal 268 further includes a polymeric compound. Thus, the outside seal 268 may prevent devices in pixel 240 from being damaged during a hardening process, and the outside seal 268 may tightly encapsulate the display apparatus.

Figure 8:
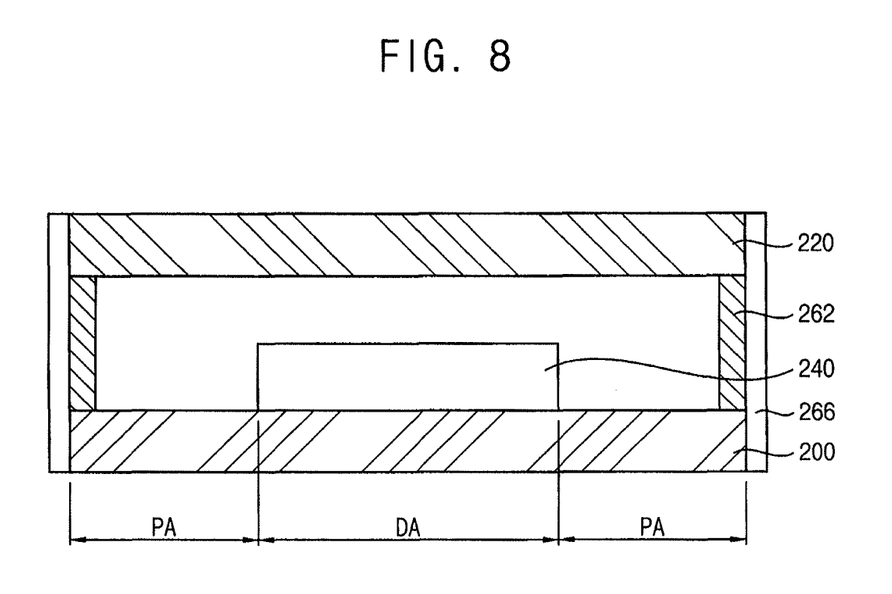
FIG. 8 is a cross sectional view illustrating a display apparatus in accordance with another example embodiment.

FIG. 8 is a cross sectional view illustrating a display apparatus in accordance with another example embodiment.

In the present example embodiment, all elements except a sealing member 262/266 are same as corresponding elements of the display apparatus described with reference in FIG. 2. Thus, a detailed description of same elements may be omitted herein to avoid repetition.

Referring to FIG. 8, a display apparatus may include the pixel 240, the first substrate 220, the second substrate 220, and a sealing member 262/266.

In the present example embodiment, the sealing member 262/266 may include first seal 262 and second seal 266.

In the present example embodiment, the first seal 262 encapsulates a gap between the first substrate 200 and the second substrate 220. The second seal 266 directly contacting an outer surface of the first substrate 200 and an outer surface of the second substrate 220 may isolate the pixel 240 from the external environment, and completely encapsulates the pixel 240. The second seal 266 may be formed by a hardening process after cutting of the display apparatus in a cell unit.

In the present example embodiment, as illustrated in FIG. 8, the first seal 262 and the second seal 266 are each a different material each other. In another example embodiment, the first seal 262 and the second seal 266 may be a same material.

In the present example embodiment, as illustrated in FIG. 8, the first seal 262 directly contacts the second seal 266. In another example embodiment (not illustrated in FIG. 8), the first seal 262 and the second seal 266 may be disposed having some space between them. In another example embodiment, another seal may be disposed between the first seal 262 and the second seal 266.

In the present example embodiment, one seal of the seals 262 and 266 may include an organic material, and the other seal of the seals 262 and 266 may include an inorganic material.

The organic seal may include a resin compound such as an epoxy resin; a detailed description of the organic seal is described above with reference in FIG. 2.

The inorganic seal may include glass material or frit; detailed descriptions of the glass and the frit are described above with reference in FIG. 2 and FIG. 5 respectively.

According to the present example embodiment, the sealing member 262/266 includes the organic seal and the inorganic seal. Thus, the sealing member 262/266 may provide the display apparatus with encapsulation having improved durability. The second seal 266 encapsulates an outer surface of the first seal 262 and an outer surface of the substrates 200 and 220 after cutting process. Thus, the dead space of the cutting process may be shrunk.

By way of summation and review, display devices may include a switching device like a thin film transistor disposed on a first substrate, wirings for connecting elements, an electrode applying a voltage to the display devices, and display elements including a red pixel, a green pixel, and a blue pixel, as thin layered structures. The display devices may be made by encapsulating those elements with a little space by a second substrate.

An organic light emitting device display may include a pixel having a thin film transistor (TFT) disposed on the first substrate, a pixel electrode connected to a drain electrode of the TFT, and an organic light emitting layer disposed between the pixel electrode and an opposite electrode. In an implementation, the pixel is disposed in a space defined by the first substrate, the second substrate, and a sealing member.

Encapsulation may be used to protect the display devices from external contaminants such as moisture and dust, and to improve reliance of the display devices and quality of an image on a screen. The encapsulation may be achieved by hardening a sealing member disposed between the first substrate and the second substrate. The sealing member may be composed of various materials. For example, a fit may be used as one of the materials for the sealing members. The frit may be selected because of excellent adhesion, effective sealing ability with slim thickness, and low temperature for processing.

The frit may be a brittle material. Thus, the frit may be fragile with respect to external impact. If an external impact is concentrated on a portion of the frit during the process of cutting a display panel into cell units, the fit may be broken. In order to accommodate the fragility of the frit, the cutting process may be carried out at a cutting line spaced apart a certain distance from a sealing region. However, when the cutting process is carried out at the cutting line spaced apart the certain distance from the sealing region, a dead space in a non-display region may be increased.

As described above, embodiments relate to a display apparatus that may provide improved productivity and durability. Example embodiments provide a display apparatus including sealing member that includes plural seals.

According to example embodiments, a display apparatus has a hybrid sealing member including an organic seal and an inorganic seal. Thus, the durability of the display apparatus against external impact may be enhanced. According to example embodiments, a display apparatus may include reinforcements and a polymeric compound. Thus, the encapsulation quality of the display apparatus may be improved. In addition, a cutting process may be conducted adjacent to the sealing member. Thus, dead space, the peripheral region excepting a pixel region, may be shrunk. Therefore, productivity of a process of making the display apparatus may be improved too.

Embodiments may provide a display apparatus having an enhanced encapsulation and improved productivity. The display apparatus may include different plural seals to mutually reinforce each other, additional reinforcements, and/or polymeric compounds. Thus, the encapsulation quality may be improved. The hybrid sealing member may enable a cutting process to be conducted adjacent to the sealing member. Therefore, the dead space, non-display region, may be shrunk. Embodiments may be applied to an electric device having a display device. For example, embodiments may be applied to a monitor of desktop computer, laptop computer, PDA, cellular phone, television, GPS navigator, etc.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display apparatus, comprising:
   a first substrate having a pixel region and a peripheral region surrounding the pixel region, the first substrate including a pixel disposed in the pixel region;
   a second substrate opposite to the first substrate; and
   a sealing member including a plurality of seals disposed on the peripheral region, the sealing member encapsulating the pixel region between first substrate and the second substrate, wherein:
   the sealing member includes a first seal, a second seal, and an outside seal,
   the first seal includes an organic material,
   the second seal includes an inorganic material and a polymeric compound,
   the outside seal includes glass frit, and
   the outside seal contacts an outer surface of the second substrate, an outer surface of the second seal, and an outer surface of the first substrate.

2. The display apparatus as claimed in claim 1, wherein the first seal surrounds the pixel region, and the second seal surrounds the first seal.

3. The display apparatus as claimed in claim 1, wherein the outside seal further includes a polymeric compound for absorbing light.

4. The display apparatus as claimed in claim 1, wherein the sealing member further includes a first reinforcement disposed between the second seal and the second substrate.

5. The display apparatus as claimed in claim 1, wherein the inorganic material includes glass frit.

6. The display apparatus as claimed in claim 2, wherein the polymeric compound absorbs light.

7. The display apparatus as claimed in claim 2, wherein the sealing member further includes a first reinforcement disposed between the second seal and the second substrate.

8. The display apparatus as claimed in claim 4, wherein the first reinforcement includes a carbon black.

9. The display apparatus as claimed in claim 4, wherein the first reinforcement includes a metal pattern.

10. The display apparatus as claimed in claim 4, wherein the sealing member further includes a second reinforcement disposed between the second seal and the first substrate.

11. The display apparatus as claimed in claim 7, wherein the first reinforcement includes a carbon black.

12. The display apparatus as claimed in claim 7, wherein the first reinforcement includes a metal pattern.

13. The display apparatus as claimed in claim 7, wherein the sealing member further includes a second reinforcement disposed between the second seal and the first substrate.

14. The display apparatus as claimed in claim 10, wherein the second reinforcement includes a carbon black.

15. The display apparatus as claimed in claim 10, wherein the second reinforcement includes a metal pattern.

16. The display apparatus as claimed in claim 13, wherein the second reinforcement includes a carbon black.

17. The display apparatus as claimed in claim 13, wherein the second reinforcement includes a metal pattern.

* * * * *